Feb. 27, 1934. H. W. STRONG 1,949,089
METHOD OF DESTRUCTIVE HYDROGENATION
Filed June 19, 1930
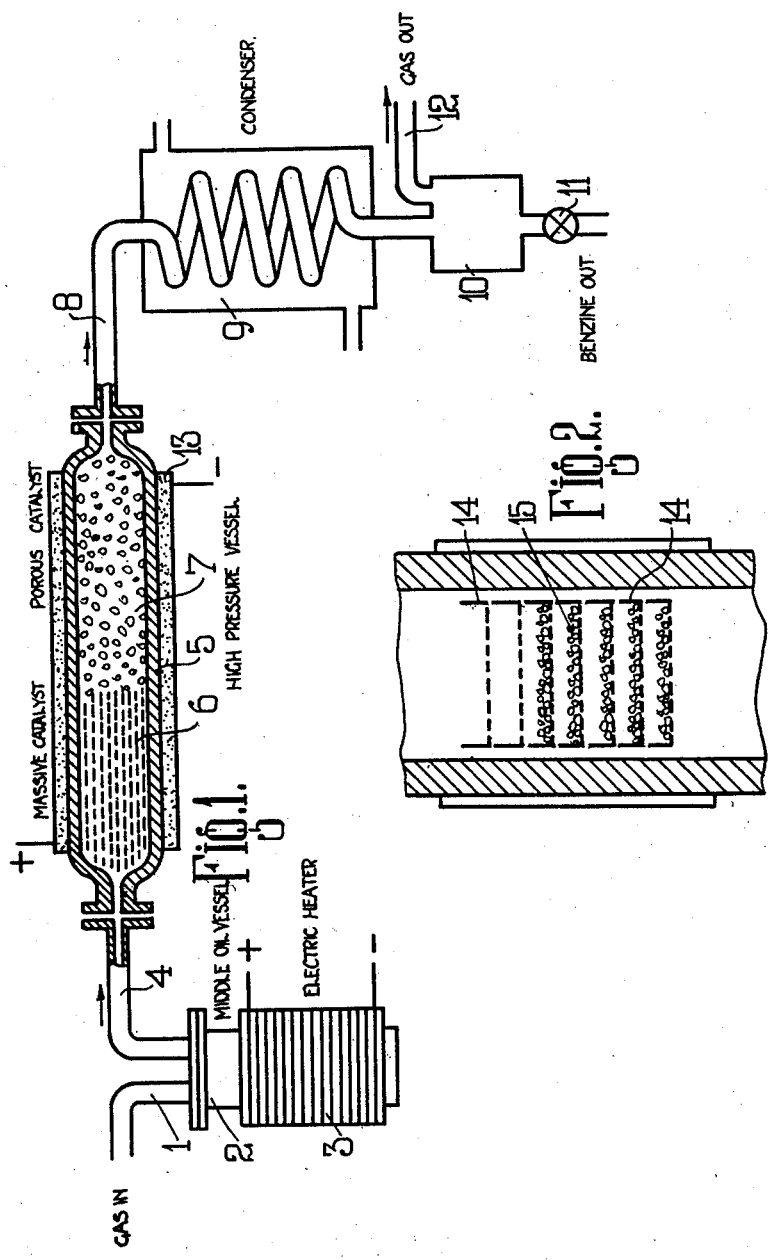

Patented Feb. 27, 1934

1,949,089

UNITED STATES PATENT OFFICE 1,949,089

METHOD OF DESTRUCTIVE HYDROGENATION

Howard William Strong, Norton-on-Tees, England, assignor to Imperial Chemical Industries Limited, London, England, a British company Application June 19, 1930, Serial No. 462,438
In Great Britain June 19, 1929

1 Claim. (Cl. 196—53)

This invention relates to the destructive hydrogenation of substances of the nature of oils in the vapour phase in the presence of hydrogen under a pressure of at least 10 atmospheres, and at an elevated temperature. According to the invention, oil vapours, together with hydrogen under a total pressure of at least 10 atmospheres, are passed in contact with a catalyst or catalysts consisting of a combination of a massive catalyst preferably composed of at least two metals or a metal and a metalloid such as arsenic, antimony, bismuth, selenium or tellurium and a porous contact mass preferably of an oxidic or metallic nature. The massive catalyst and the porous catalyst may be placed in juxtaposition or they may be placed in separate vessels, and the vapours conducted over each in series. It is particularly advantageous to dispose the porous contact mass upon the massive catalyst, for instance by employing perforated trays made of the massive catalyst, and partly filling these with pieces or pellets made of the porous contact mass.

The massive catalyst employed according to the invention are such as are described in my co-pending applications Serial Nos. 462,435 and 462,437 for example, tin-coated iron, or iron coated with nickel, cobalt or molybdenum. Alloys containing tin which do not melt at the reaction temperature may also be employed, as described in my co-pending application Serial No. 462,437.

The porous catalysts may comprise any of the well known catalytic substances used for destructive hydrogenation, or ferric oxide, bog iron ore, or a catalyst containing iron such as is used for the conversion of carbon monoxide with steam. This later catalyst consists of iron oxide containing 1 to 5 per cent. of aluminium oxide and is prepared by precipitating the oxides from solution, followed by ignition of the precipitate and pelleting.

The porous catalysts may also consist of a porous support, such as pumice or magnesia impregnated with catalytic metals or oxides. Such catalysts containing reducible oxides may become reduced to the metal in the course of the reaction; if desired, the reduction can be carried out beforehand by heating the oxidic masses in a stream of reducing gas, e.g. hydrogen.

A process for the production of hydrocarbons of low boiling point from those of high boiling point by destructive hydrogenation with the joint aid of catalysts consisting of iron coated with zinc and ferric oxide, has been described by me in my co-pending application Serial No. 438,907.

The temperature of the reaction vessel should be maintained between 450 and 550° C., and preferably between 480 and 520° C. The pressure as stated, exceeds 10 atmospheres and is preferably of the order of 100–250 atmospheres. The ratio of hydrogen to oil is about 2500 $M^3$ per ton of oil, and the time of reaction is one minute, employing a reaction space of 14.7 $M^3$ in volume. The proportion of catalyst and reaction materials used may, of course, vary to a large extent, but about one third to one half the reaction space may be occupied by the catalyst, but the proportion of massive to porous catalyst may vary between 10 and 50 per cent.

The catalysts are immune from sulphur poisoning.

The invention may be carried out for example, as shown in the accompanying drawing of which Fig. 1 represents a side elevation partly in section of an apparatus for carrying out the process, while Fig. 2 shows a detail of a modification.

In Fig. 1 hydrogen is led by pipe 1 through the vessel 2 which is heated electrically by the heater 3 and which contains middle oil.

The vapours of middle oil mixed with hydrogen pass through the tube 4 into the vessel 5 where they come into contact with the massive catalyst 6 and the porous catalyst 7. The vapours then pass out by the pipe 8 to the condenser 9 and the liquid condensed is collected in the catch pot 10 from which it is withdrawn through valve 11. The gases pass out by pipe 12. The vessel 2 may be heated by a heater 13.

In Fig. 2 the reaction vessel is vertical and the massive catalyst consists of trays 14 upon which are arranged pellets 15 of porous catalyst.

In the above specification and the appended claims "massive catalyst" is used to cover a catalyst in massive form such as plates or cylinders. in contradistinction to catalysts in powdered or porous form such as usually employed in catalytic operations. By the term "in bulk" is to be understood in pieces or pellets of apreciable size or in layers of appreciable thickness as distinct from deposits in small amounts.

By the term "massive catalyst" in the following claim I intend to include metals in densely compact state such as in sheets, cast or molded forms which are readily replaceable and by "juxtaposed catalysts" I intend at least two catalysts simultaneously exerting their influence while both are in surface contact with the reactants, as distinguished from the deposition of one of said catalysts on the other so as to envelop or enclose it.

I declare that what I claim is:—

In a process for the destructive hydrogenation of heavy hydrocarbon oil in vapor phase in the presence of hydrogen under a total pressure of at least 10 atmospheres and at an elevated temperature, the improvement which comprises operating under the simultaneous influence of juxtaposed catalytic materials of the massive metallic and porous types, the said massive catalyst being iron coated with tin and the said porous catalyst being ferric oxide.

HOWARD W. STRONG.